(12) United States Patent
Kurimoto et al.

(10) Patent No.: US 9,707,908 B2
(45) Date of Patent: Jul. 18, 2017

(54) DRIVING DEVICE

(71) Applicant: MITSUBISHI ELECTRIC CORPORATION, Tokyo (JP)

(72) Inventors: Masanori Kurimoto, Tokyo (JP); Yuki Iwagami, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/044,168

(22) Filed: Feb. 16, 2016

(65) Prior Publication Data
US 2017/0021782 A1    Jan. 26, 2017

(30) Foreign Application Priority Data
Jul. 21, 2015  (JP) .................................. 2015-143895

(51) Int. Cl.
| | | |
|---|---|---|
| *B60R 16/023* | (2006.01) | |
| *G01M 17/00* | (2006.01) | |
| *G05B 23/02* | (2006.01) | |
| *G06F 19/00* | (2011.01) | |

(52) U.S. Cl.
CPC ......... *B60R 16/0232* (2013.01); *G01M 17/00* (2013.01); *G05B 23/02* (2013.01); *G06F 19/00* (2013.01)

(58) Field of Classification Search
CPC ................................................. B60R 16/0232
USPC ........................................................ 701/29.1
See application file for complete search history.

(56) References Cited

U.S. PATENT DOCUMENTS

| | | | | | |
|---|---|---|---|---|---|
| 5,579,747 | A | * | 12/1996 | Sato | .................... F02D 41/0037 |
| | | | | | 123/690 |
| 5,771,247 | A | * | 6/1998 | Allen | .................. G06F 11/1044 |
| | | | | | 714/763 |
| 6,029,630 | A | * | 2/2000 | Toyohara | .............. F02D 41/263 |
| | | | | | 123/406.58 |
| 2005/0173515 | A1 | * | 8/2005 | Sawa | ................. G07D 11/0069 |
| | | | | | 235/379 |

(Continued)

FOREIGN PATENT DOCUMENTS

| | | |
|---|---|---|
| JP | 7-043257 A | 2/1995 |
| JP | 200955657 A | 3/2009 |

(Continued)

OTHER PUBLICATIONS

Communication dated Jun. 21, 2016, from the Japanese Patent Office in counterpart application No. 2015-143895.

*Primary Examiner* — Tyler J Lee
(74) *Attorney, Agent, or Firm* — Sughrue Mion, PLLC; Richard C. Turner (57) ABSTRACT

A driving device 5 includes: a fault detection device 11 that determines a fault in an actuator 6; a serial interface 7 that communicates with an MCU 2; a memory device 10 that stores a program received from the MCU 2 and a fault determination result by the fault detection device 11; a CPU 9 that causes the fault detection device 11 to execute the fault determination according to a fault determination request from the MCU 2; a timer device 16 that measures a limit time over which fault determination is performed and a determination period of fault determination; and a counter device 17 that counts the number of repeats of fault determination and the number of fault occurrences in the actuator 6.

12 Claims, 6 Drawing Sheets

(56) References Cited

U.S. PATENT DOCUMENTS

| | | | |
|---|---|---|---|
| 2005/0207056 A1* | 9/2005 | White | G11B 5/596 360/78.05 |
| 2016/0124800 A1* | 5/2016 | Litovtchenko | G06F 11/0721 714/10 |
| 2016/0381068 A1* | 12/2016 | Galula | H04L 63/123 726/23 |
| 2017/0013005 A1* | 1/2017 | Galula | H04L 63/1425 |

FOREIGN PATENT DOCUMENTS

| | | |
|---|---|---|
| JP | 2009-077542 A | 4/2009 |
| JP | 2014-046730 A | 3/2014 |

* cited by examiner

| REGISTER | Address | | | | | | Data | | | | |
|---|---|---|---|---|---|---|---|---|---|---|---|
| | A5 | A4 | A3 | A2 | A1 | A0 | ... | b3 | b2 | b1 | b0 |
| FAULT FLAG | 0 | 0 | 0 | 0 | 0 | 0 | 0 : NoFault, 1 : Fault | DRIVER 3 | DRIVER 2 | DRIVER 1 | DRIVER 0 |

⇩ DETAILS

| | A5 | A4 | A3 | A2 | A1 | A0 | | b3 | b2 | b1 | b0 |
|---|---|---|---|---|---|---|---|---|---|---|---|
| DRIVER 0 | 1 | 0 | 0 | 0 | 0 | 0 | | | | | |
| DRIVER 1 | 1 | 0 | 0 | 0 | 0 | 1 | 0 : NoFault, 1 : Fault | OVER-CURRENT | OPEN | POWER SHORT | GROUND SHORT |
| DRIVER 2 | 1 | 0 | 0 | 0 | 1 | 0 | | | | | |

| REGISTER | Address | | | | | | Data | | | | |
|---|---|---|---|---|---|---|---|---|---|---|---|
| | A5 | A4 | A3 | A2 | A1 | A0 | ... | b3 | b2 | b1 | b0 |
| FAULT FLAG | 0 | 0 | 0 | 0 | 0 | 0 | 0 : NoFault, 1 : Fault | DRIVER 3 | DRIVER 2 | DRIVER 1 | DRIVER 0 |
| FAULT MASK | 0 | 1 | 0 | 0 | 0 | 0 | 0 : Mask, 1 : Unmask | DRIVER 3 | DRIVER 2 | DRIVER 1 | DRIVER 0 |

DRIVING DEVICE

BACKGROUND OF THE INVENTION

1. Field of the Invention

The present invention relates to a driving device, and more particularly to a driving device that drives actuators installed in a vehicle such as an automobile.

2. Description of the Related Art

Important initiatives have been undertaken in recent years to standardize the functional safety of electrical equipment and electronic devices installed in automobiles. Rigorous assessment in terms of defining faults in mounted electronic components, clarifying fault determination criteria, and addressing the faults applies also to electronic control units (ECUs) that control power trains. The demands placed also on responsiveness to such faults are likewise stringent.

As system complexity increases, the targets of fault determination become more numerous, and fault determination requirements become likewise more complex. The processing load of the ECU and the communication traffic between the ECU and associated devices increase as a result.

Herein, the term "power train" denotes an apparatus for efficiently transmitting rotational energy, generated by an engine, to tires. The power train includes a clutch, a transmission, a propeller shaft, a differential gear and a drive shaft.

A system control device disclosed in Japanese Patent Application Publication No. H7-43257 is made up of two chips, namely a host-side unit and a sub-side unit. The host-side unit has a host processor that performs main system control. The sub-side unit has a subprocessor that performs subsidiary system control, and a standby system processor that performs system control occasionally when an abnormality occurs. The host processor and the subprocessor operate according to a first clock, and the standby system processor operates according to a second clock. The host processor, the subprocessor and the standby system processor each have a fault self-determination execution circuit. The fault self-determination execution circuits of the host processor and of the subprocessor perform fault determination using the second clock, while the fault self-determination execution circuit of the standby system processor performs fault determination using the first clock. Japanese Patent Application Publication No. H7-43257 discloses the feature of securing a reliable fail-safe function by using different clock system in the standby system processor alone.

A vehicular electronic control device disclosed in Japanese Patent Application Publication No. 2014-046730 is provided with a driver IC and a microcontroller. The microcontroller inputs a diagnosis start signal to the driver IC, via serial communication. Upon reception of the diagnosis start signal, the driver IC reads, from a ROM, the ON/OFF state of each driver circuit, in a group of registers. Each driver diagnosis circuit performs then diagnosis upon turn-on/off, according to the values of the registers. Drive circuits detected to be faulty as a result of the diagnosis are brought to an inactive state, and the microcontroller is notified of the fact.

The load drive device disclosed in Japanese Patent Application Publication No. 2009-077542 is built into an electronic control device. The load drive device drives a load such as a solenoid. The load drive device is provided with a drive circuit and a diagnosis circuit. The diagnosis circuit diagnoses the state of the load. The diagnosis circuit operates upon system initialization or while the drive circuit is stopped. The drive circuit stops when a drive-stop signal is inputted to the electronic control device, from a control circuit that controls the drive circuit. The normal operation of the diagnosis circuit is thus checked in a state where the load drive device remains built into the electronic control device.

SUMMARY OF THE INVENTION

Technical Problem

In the system control device disclosed in Japanese Patent Application Publication No, H7-43257, each unit is equipped with a fault self-determination execution circuit, and the host-side unit is notified of the fault detection results using hard logic. Therefore this was for instance problematic in that, without changes in hardware, software could not cope with various fault detection conditions.

The vehicular electronic control device disclosed in Japanese Patent Application Publication No. 2014-046730 envisages only turn-on/off of each driver circuit stored in a ROM. In Japanese Patent Application Publication No. 2014-046730, the ROM can hold only a diagnosis pattern (on/off combination) of identical timing (simultaneous) for each driver circuit. This was therefore problematic in that separate fault determination scenarios for each driver circuit could not be programmed.

The diagnosis circuit in the load drive circuit disclosed in Japanese Patent Application Publication No. 2009-077542 operates upon system initialization or while the drive circuit is stopped. Therefore, Japanese Patent Application Publication No. 2009-077542 was problematic in that, without changes in hardware, software could not cope with various fault detection conditions.

In order to solve the above problems, it is an object of the present invention to provide a driving device that is capable of meeting various fault detection requirements for each actuator, in actuator fault detection, using software and without changes in hardware.

Solution to Problem

The present invention is a driving device that is connected between a control unit and an actuator and that drives the actuator through control by the control unit, the driving device comprising: a fault detection device that determines a fault in the actuator; a serial interface that communicates with the control unit; a memory device that stores a fault determination result by the fault detection device and a program received from the control unit via the serial interface; a processor that, according to a fault determination request from the control unit, executes the program, and causes the fault detection device to execute the fault determination; a timer that measures a limit time for fault determination by the fault detection device and a determination period of fault determination by the fault detection device; and a counter that counts the number of repeats of the fault determination executed by the fault detection device, and the number of fault occurrences in the actuator as detected by the fault detection device, wherein, upon reception of the fault determination request from the control unit, the processor executes the program to cause as a result the fault detection device to execute the fault determination for the number of repeats for each determination period within the limit time, and after the limit time has elapsed, transmits fault determination results by the fault detection device to the control unit.

Advantageous Effects of Invention

In the present invention, the driving device includes a memory device and a processor, and is configured to detect faults through software processing. Therefore, fault determination according to a desired fault determination requirement can be carried out simply through rewriting of the fault determination requirement in the memory device. It becomes accordingly possible to meet various fault detection requirements in actuator fault detection, using software and without changes in hardware.

DESCRIPTION OF EMBODIMENTS

Embodiments for carrying out the present invention will be explained next with reference to accompanying drawings.

Figure 1:
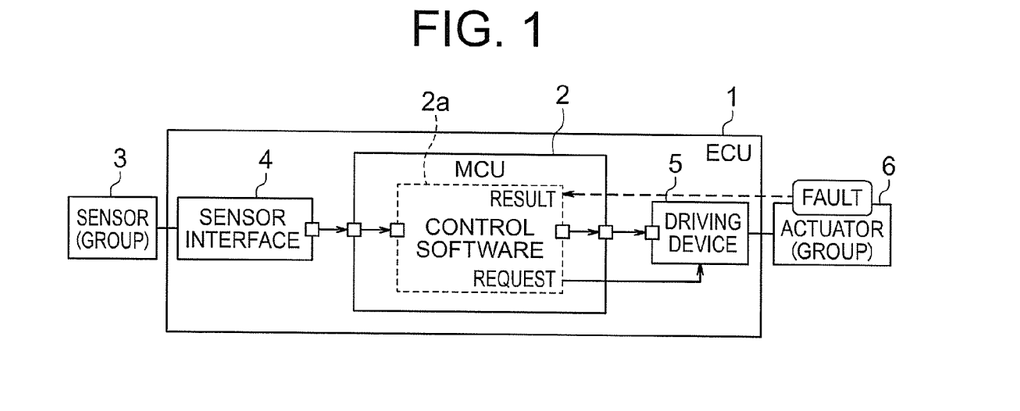
FIG. 1 is a block diagram illustrating the structure of a general power train ECU.

A general power train ECU will be explained first in order to better understand the embodiments of the present invention. FIG. 1 illustrates the structure of a general power train ECU. The ECU 1 consists of a micro control unit (MCU) 2, as a control unit, a sensor interface 4 and a driving device 5.

The ECU 1 is connected to a sensor (group) 3 and an actuator (group) 6. The sensor (group) 3 is one or more sensors for detecting the state of a vehicle. The sensor (group) 3 includes, for instance, at least one sensor from among an accelerator sensor, an airflow sensor, an intake air temperature sensor, a throttle opening sensor, a water temperature sensor, a rotation sensor, an $O_2$ sensor and a vehicle speed sensor. The actuator (group) 6 is one or more actuators. Examples of the actuators 6 include, for instance, a solenoid valve, an injector, a throttle valve and an igniter.

The MCU 2 has control software 2a therein. The MCU 2 receives information from the sensor (group) 3 via a sensor interface 4. The MCU 2 controls one or more actuators 6 via the driving device 5.

The driving device 5 drives the actuators 6 by means of control by the MCU 2. The driving device 5 has a fault detection device 11 installed therein. The driving device 5 detects timely, using the fault detection device 11, a fault (power short, ground short, open, overcurrent) in the actuators 6.

In order to check the occurrence or absence of a fault in the actuators 6, the MCU 2 issues periodically an instruction to the driving device 5. Upon reception of the instruction, the driving device 5 transmits, to the MCU 2, a fault report indicating the occurrence or absence of a fault in the actuators 6. The MCU 2 monitors the state of the actuators 6 by checking the fault report from the driving device 5.

Figure 2:
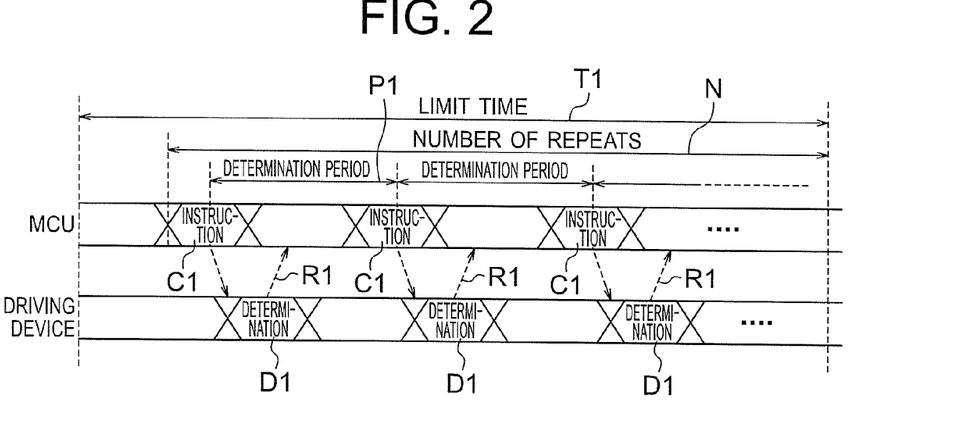
FIG. 2 is a time chart illustrating communication, during normal operation, between an MCU and a driving device in a general power train ECU.

FIG. 2 illustrates communication between the MCU 2 and the driving device 5. Firstly, the MCU 2 issues a fault determination request (instruction) to the driving device 5. The driving device 5 determines various types of fault (power short, ground short, open, overcurrent) in the actuators 6, using the fault detection device 11, and transmits the determination result, as a fault report, to the MCU 2. If no fault has occurred in the actuators 6, the MCU 2 keeps on issuing a fault determination request to the driving device 5 over a preset determination period P1. Depending on the type of the actuator 6, the MCU 2 may in some instances transmit a fault determination request over a prescribed number of times, within a limit time, under a different fault determination condition. The fault determination condition includes, for instance, the voltage or temperature of the actuator.

Figure 3:
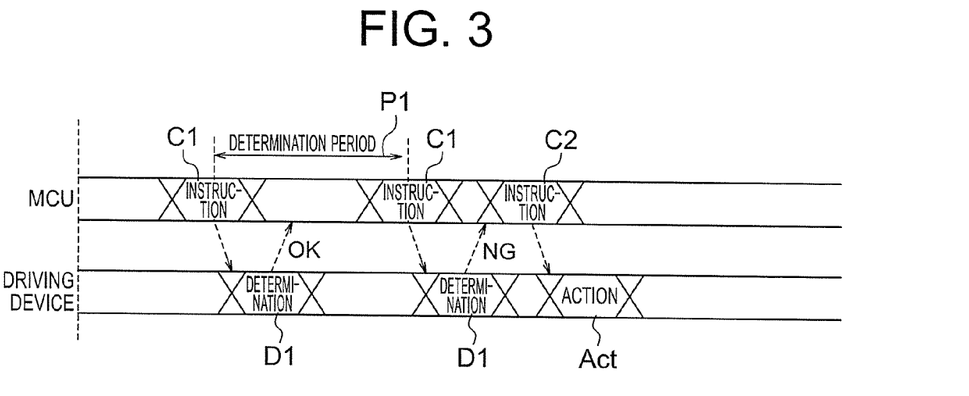
FIG. 3 is a time chart illustrating communication, upon fault occurrence, between an MCU and a driving device in a general power train ECU.

By contrast, when a fault occurs in at least one of the actuators 6, i.e. in a case where the determination result is NG, as illustrated in FIG. 3, the MCU 2 instructs an action Act based on analyzed fault content, to the driving device 5. As the action Act, the MCU 2 issues, to the driving device 5 that is controlling the actuator 6 in which a fault has occurred, for instance an instruction for discontinuing the operation of the actuator 6.

Ordinarily, a plurality of driving devices 5 is installed in the ECU 1. The MCU 2 monitors the fault state of each actuator 6 to be controlled. The MCU 2 triggers information from the sensor (group) 3, and processes in real time information having been worked in the sensor interface 4. The MCU 2 must perform, in real time, various tasks for processes other than the foregoing, and must exchange information with a communication interface. Accordingly, the ECU 1 requires a mechanism for reducing as much as possible communication load associated with the above fault determination.

The required specifications of the fault determination request depend on each actuator 6. Accordingly, the driving device 5 preferably has a highly versatile, reconfigurable fault determination function. Otherwise, it becomes necessary to re-design the driving device 5 for each actuator 6. Higher costs and development delays may be incurred in such a case.

In the communication between the MCU and the driving device, however, determination and control by the MCU are required only upon fault occurrence (determination result NG). Vehicular devices have higher reliability than consumer products for household use, and hence the probability of fault occurrence in such vehicular devices is very low. Therefore, if the fault determination requirement that is requested for each driving device is satisfied, it is sufficient to report the necessary information to the MCU, from each driving device, only upon fault occurrence. In the embodiment of the present invention, therefore, a fault determination device is provided, in each driving device, to recognized fault determination conditions. The driving device is provided with a function of sending a fault report to the MCU, periodically or upon fault occurrence. As a result, communication traffic is alleviated while contributing to upholding real-time processing. In the embodiment of the present invention, the driving device is provided with a simple processor and a memory. The driving device performs fault determination through software processing, using a simple processor and a memory. As a result, the driving device need not be re-designed for actuators having a specific fault determination requirement.

Embodiments of the present invention will be explained next. The driving device 5 according to Embodiment 1 of the present invention drives one or more actuators 6 that are installed in a vehicle, and upon reception on an instruction from the MCU 2, determines the occurrence or absence of a fault in the actuators 6.

Embodiment 1

Figure 4:
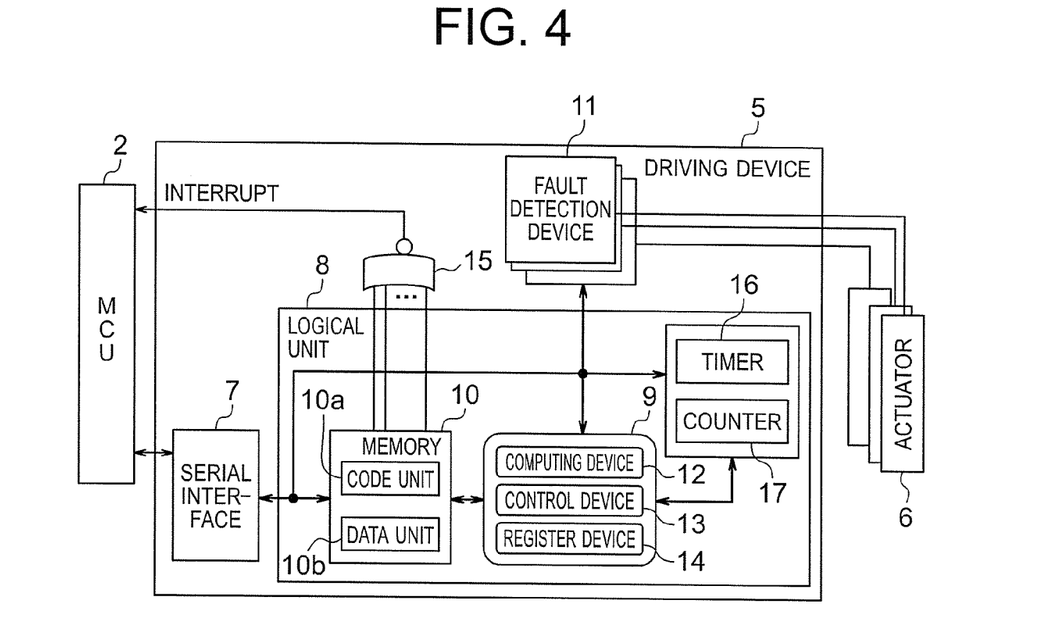
FIG. 4 is a block diagram illustrating the structure of a driving device according to Embodiment 1 of the present invention.

FIG. 4 illustrates the structure of the driving device according to Embodiment 1 of the present invention. As illustrated in FIG. 4, the driving device 5 according to Embodiment 1 is connected between the MCU 2 and the actuators 6. The number of actuators 6 is one or more. These actuators 6 make up an actuator group.

Also, in Embodiment 1, the driving device 5 and the MCU 2 are installed in the ECU 1 together with the sensor interface 4 as illustrated in FIG. 1. The structure of the ECU 1 and the structure of the sensor (group) 3 are basically identical to those of FIG. 1, and an explanation thereof will be omitted herein. The difference between Embodiment 1 and FIG. 1 resides in the structure and operation of the driving device 5.

A serial interface 7, a logical unit 8, a fault detection device 11, and an interrupt generator 15 are provided in the driving device 5.

The serial interface 7 exchanges signals with the MCU 2. The serial interface 7 receives instructions from the MCU 2 and transmits fault reports to the MCU 2.

One fault detection device 11 is provided for each actuator 6. Each fault detection device 11 monitors faults (power short, ground short, open, overcurrent) in the respective actuator 6, and stores a normal/abnormal status, in the form of a fault flag, in a fault flag register that is provided in a data unit 10b of a memory device 10. Specifically, the fault flag is set to "0" in a case where the actuator 6 is normal, and is set to "1" in a case where the actuator 6 is abnormal.

The logical unit 8 decodes the instructions from the serial interface 7, and executes a necessary process. The logical unit 8 transmits, to the serial interface 7, information that is necessary for reporting to the MCU 2. Further, a central processor unit CPU (CPU) 9, as a processor, the memory device 10, a timer device 16 and a counter device 17 are provided in the logical unit 8.

The memory device 10 has a code unit 10a in which programs are written, and the data unit 10b in which data is written. Respective vectors having a fault determination requirement described therein are allocated for each fault detection device 11 in the code unit 10a. Upon reception of an instruction from the MCU 2, the driving device 5 executes, by means of each fault detection device 11, fault determination based on the above fault determination requirement, using the CPU 9. The memory device 10 programs and stores, for each fault detection device 11 corresponding to a respective actuator 6, a limit time T1, the determination period P1, and the number of repeats N, for performing fault determination, as well as a fault determination requirement.

The CPU 9 consists of a computing device 12, a control device 13 and a register device 14. The CPU 9 defines and executes, by means of the computing device 12 and the control device 13, a program sequence that is described in the vectors that are registered in the code unit 10a of the memory device 10.

The interrupt generator 15 monitors fault flags that are stored in the data unit 10b of the memory device 10. The interrupt generator 15 detects that a fault has occurred in the actuator (group) 6 in a case where a fault flag is "1". When a fault occurs, the interrupt generator 15 transmits an interrupt signal to the MCU 2.

The timer device 16 measures the limit time T1 and determination period P1 described below.

The counter device 17 counts the number of repeats N over which the fault detection device 11 repeatedly performs fault determination, and the number of fault occurrences in the respective actuator 6 as detected through that fault determination.

The power source and clock for operating the above logic in the serial interface 7, the logical unit 8, the fault detection device 11 and the interrupt generator 15 in the driving device 5 are supplied from outside the driving device 5.

Figure 12:
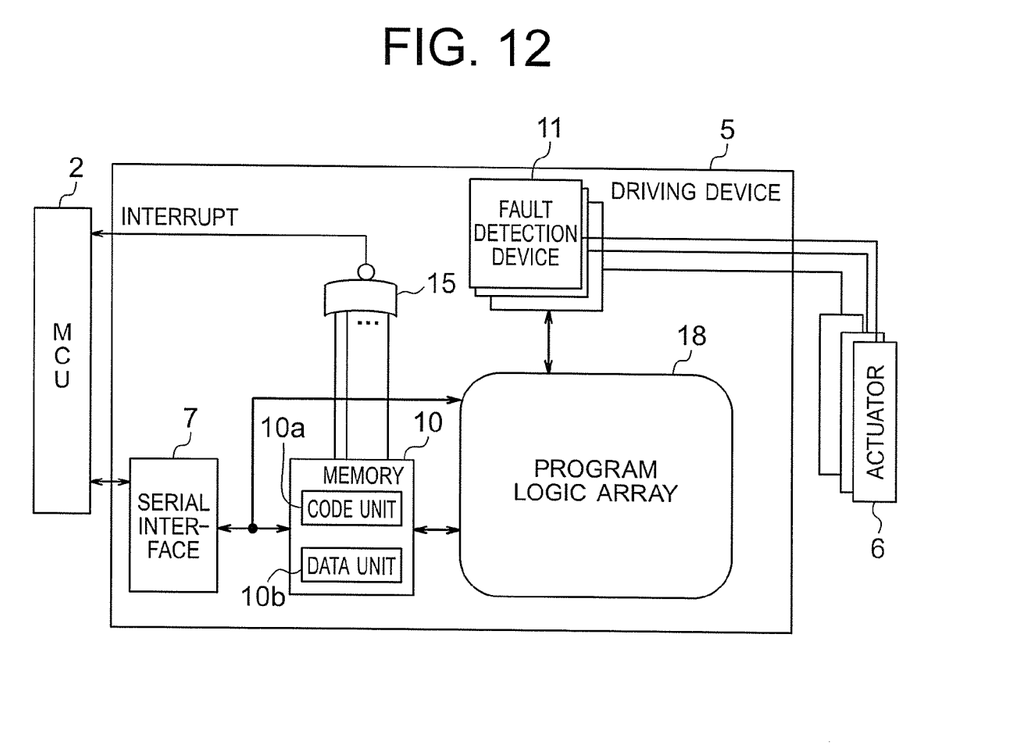
FIG. 12 is a block diagram illustrating the structure of a variation of the driving device according to Embodiment 1 of the present invention.

FIG. 12 illustrates the structure of another form (variation) of the driving device according to Embodiment 1 of the present invention.

In the structure of FIG. 12, a program logic array 18 is provided, instead of the CPU 9, the timer device 16 and the counter device 17 of the structure of FIG. 4. In FIG. 12, hardware configuration information based on a fault determination request, from outside or from the MCU 2, is downloaded to the code unit 10a of the memory device 10, via the serial interface 7. The program logic array 18 reconstructs a logic on the basis of the information that is downloaded to the code unit 10a.

The operation in Embodiment 1 will be explained next on the basis of Operation examples 1 to 4. The operation in the case of the structure of FIG. 4 will be explained in Operation examples 1 to 3, and the operation of the case of the structure of FIG. 12 will be explained in Operation example 4.

Operation Example 1

The driving device 5 performs a routine work for determining the occurrence or absence of a fault in a respective actuator 6, namely "receives a fault determination request from the MCU 2, and replies with a determination result to the MCU 2". The driving device 5 software-processes the routine work according to a program sequence stored in the code unit 10a of the memory device 10, using the CPU 9.

The driving device 5 generates an interrupt signal for the MCU 2, using the interrupt generator 15, only when a fault occurs in the actuator 6. In other words, if no fault has occurred in the actuator 6, the driving device 5 puts together the determination result of every given determination period P1 for N times, and transmits the result in the form of a fault report R1 to the MCU 2 after a preset limit time T1 has elapsed. As a result, data communication between the MCU 2 and the driving device 5 is significantly reduced, while upholding real-time processing.

Figure 5:
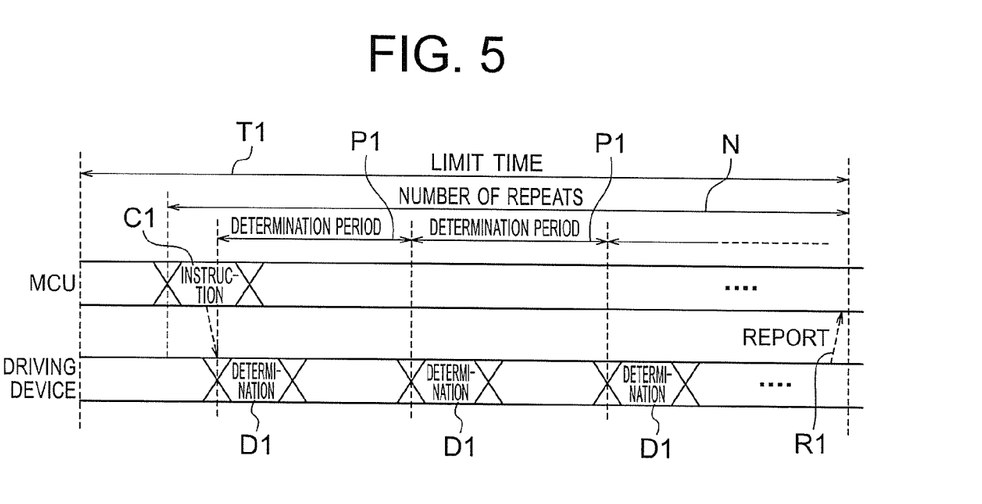
FIG. 5 is a time chart, during normal operation, between an MCU and a driving device in Operation example 1 of the driving device according to Embodiment 1 of the present invention.

FIG. 5 illustrates a time chart during normal operation of the MCU 2 and the driving device 5. In FIG. 5, the limit time T1 is a period of time over which the driving device 5 performs fault determination. The limit time T1 is set beforehand. The number of repeats N is the number of times that the driving device 5 repeatedly performs fault determination. The number of repeats N is set beforehand. The determination period P1 is a period during which the driving device 5 carries out fault determination. Instruction C1 is s fault determination request that is transmitted from the MCU 2 to the driving device 5. The fault determination request is an instruction of requesting the driving device 5 to perform fault determination of determining whether or not a fault has occurred in a respective actuator 6. Determination D1 denotes the fault determination carried out by the driving device 5. The report R1 is the determination result that is transmitted by the driving device 5 to the MCU 2. The limit time T1, the number of repeats N, and the determination period P1 may be set according an instruction from the MCU 2 or from outside, or may be preset in the driving device 5.

In the limit time T1, firstly the MCU 2 transmits a fault determination request (instruction C1) to the driving device 5, as illustrated in FIG. 5. In response to the received instruction C1, the driving device 5 repeatedly carries out fault determination for the number of repeats N, until the limit time T1 elapses. The period of repetition herein is the determination period P1. When the limit time T1 has elapsed, the driving device 5 transmits the determination result (fault report R1) to the MCU 2. The determination result (fault report R1) includes a fault determination result for the number of repeats N.

After the fault determination request (instruction C1) has been issued by the MCU 2 to the driving device 5, thus, no communication takes place between the MCU 2 and driving device 5 until the limit time T1 elapses, as illustrated in FIG. 5. That is, no communication load arises between the MCU 2 and the driving device 5 unless a fault occurs in the actuator (group) 6. In the general case illustrated in FIG. 2, by contrast, communication between the MCU 2 and the driving device 5 takes place at each determination period P1. A comparison between FIG. 5 and FIG. 2 reveals that communication load is thus significantly reduced in Embodiment 1.

In Embodiment 1, the fault state of each actuator 6 can be monitored periodically by setting beforehand the number of repeats N. A comparison between FIG. 5 and FIG. 2 reveals that in Embodiment 1, the driving device 5 repeatedly carries out the fault determination D1, similarly to FIG. 2, even though there is no instruction from the MCU 2. The determination result need not be transmitted to the MCU 2 at every determination period P1 if no fault occurs in any of the actuators 6. In Embodiment 1, therefore, the driving device 5 transmits collectively to the MCU 2 the determination results for N times, in the form of the fault report R1, when the limit time T1 has elapsed. Communication load in Embodiment 1 is significantly reduced as a result.

In Embodiment 1, in a case where a fault occurs in at least one of the actuators 6, the driving device 5 immediately transmits an interrupt signal to the MCU 2 using the interrupt generator 15, to notify the MCU 2 of the occurrence of the fault. As a result, the driving device 5 can immediately notify the MCU 2 of the fault occurrence. Compared with the instance of FIG. 3, fault determination and fault detection in the actuators 6 are not carried out herein until reception of a fault determination request (instruction C1) from the MCU 2 in FIG. 3, and hence the notification of a fault occurrence is delayed correspondingly. The maximum delay time is the length of time of the determination period P1. In Embodiment 1, therefore, quick notification of fault occurrence is achieved, and hence real-time processing is upheld.

In Embodiment 1, there are provided the CPU 9 and the memory device 10, and fault determination is set to be carried out through software processing. Accordingly, a fault determination requirement that is specific of each actuator 6 based on various fault determination requests and scenarios can be modified through simple rewriting of the content of the code unit 10a of the memory device 10. The various fault determination requirements of the actuators 6 can be met as a result in Embodiment 1 using software, without modifying the hardware of the driving device 5.

Figure 6:
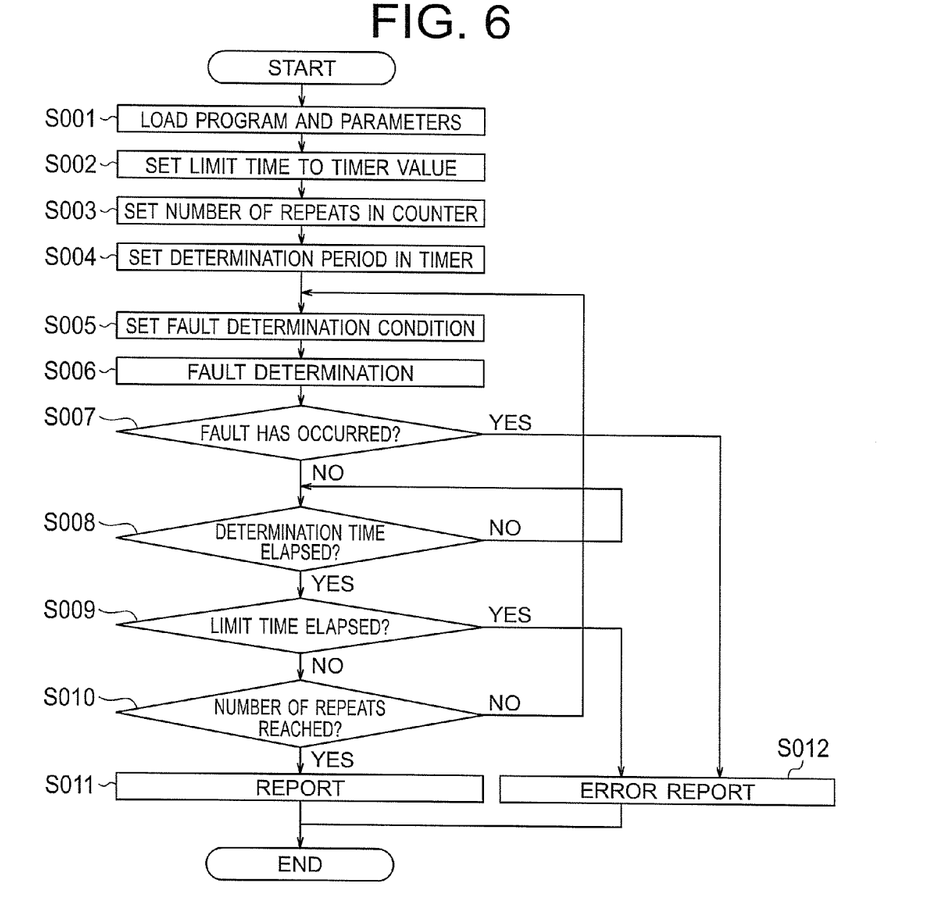
FIG. 6 is a flowchart illustrating a process flow in Operation example 1 and Operation example 2 of the driving device according to Embodiment 1 of the present invention.

FIG. 6 illustrates a fault diagnosis flowchart of the driving device 5 according to Operation example 1 of Embodiment 1.

In step S001, as illustrated in FIG. 6, the driving device 5 firstly imports a programs and parameters from the MCU 2 into the memory device 10 in the logical unit 8, via the serial interface 7.

Next, if there is a parameter for setting the limit time T1 in the program imported into the memory device 10, in step S002 the driving device 5 sets the limit time T1 in the timer device 16 on the basis of the above parameter.

Next, if there is a parameter for setting the number of repeats N in the program imported into the memory device 10, in step S003 the driving device 5 sets the number of repeats N in the counter device 17 on the basis of the above parameter. The counter device 17 decrements the counter value of the number of repeats each time that one fault determination is complete. The counter device 17 also resets the counter value of the number of fault occurrences at that time. The counter device 17 increments the counter value of the number of fault occurrences each time that a fault is detected as a result of fault determination.

Next, if there is a parameter for setting the determination period P1 in the program that is imported into the memory device 10, in step S004 the driving device 5 sets the determination period P1 in the timer device 16 on the basis of the above parameter.

Next, if there is a specific fault determination condition for each actuator 6, in step S005 the driving device 5 sets the specific fault determination condition in the memory device 10. On the other hand, if there is not a specific fault determination condition for each actuator 6, the fault determination conditions (default values) stored beforehand in the memory device 10 are kept unchanged. The fault determination condition includes at least one from among, for instance, the voltage, temperature and operation mode of the actuator 6, or the ambient temperature of the actuator 6.

Next, in step S006, the driving device 5 receives a fault determination request (instruction C1) from the MCU 2, and in response thereto, performs fault determination of each actuator 6 using the fault detection device 11, through control by the CPU 9. The fault detection device 11 determines the occurrence or absence of a fault in each actuator 6, and stores a normal/abnormal status, in the form of a fault flag "0"/"1", in the fault flag register of the data unit 10b of the memory device 10. Upon fault detection, the fault detection device 11 also detects the type of the fault (power short, ground short, open, overcurrent), and the type of the fault is stored in a detailed information register of the data unit 10b of the memory device 10.

Next, in step S007, the driving device 5 checks the content of the fault flag register of the data unit 10b of the memory device 10 using the interrupt generator 15. If there is no fault, the process proceeds accordingly to step S008. The operation in a case where a fault has occurred will be explained in Operation example 2 described below.

In step S008, the driving device 5 stands by until a determination time determined according to the determination period P1 elapses, on the basis of the time measured by the timer device 16, and once the determination time has elapsed, the process proceeds to step S009. Measurement of the determination time is initiated, as a starting point, at the point in time of reception of the fault determination request (instruction C1) from the MCU 2.

In step S009, the driving device 5 checks whether or not the limit time T1 has elapsed, on the basis of the time measured by the timer device 16. If the limit time T1 has elapsed, the process proceeds to step S102, and the driving device 5 sets an error flag in the data unit 10b of the memory device 10, and outputs a fault report R1 to the MCU 2. On the other hand, if the limit time T1 has not elapsed, the process proceeds to step S010.

In step S010, the driving device 5 checks the repetition counter value of the counter device 17; if the repetition counter value has been reached the number of repeats N, the process proceeds to step S011, whereas if the repetition counter value has not been reached the number of repeats N, the process returns to step S005, and the process from step S005 to S009 is repeated.

In step S011, the driving device 5 transmits the fault determination result to the MCU 2, via the serial interface 7. After the above transmission, the driving device 5 terminates the program process.

Similarly, also in step S012, the driving device 5 transmits the fault determination result to the MCU 2, via the serial interface 7. After the above transmission, the driving device 5 terminates the program process.

Whenever the fault determination condition in the memory device 10 needs to be modified, the driving device 5 modifies the fault determination condition in step S005.

The process corresponding to a time of fault occurrence in step S007 will be explained below in Operation example 2, with reference to FIG. 7.

Operation Example 2

Figure 7:
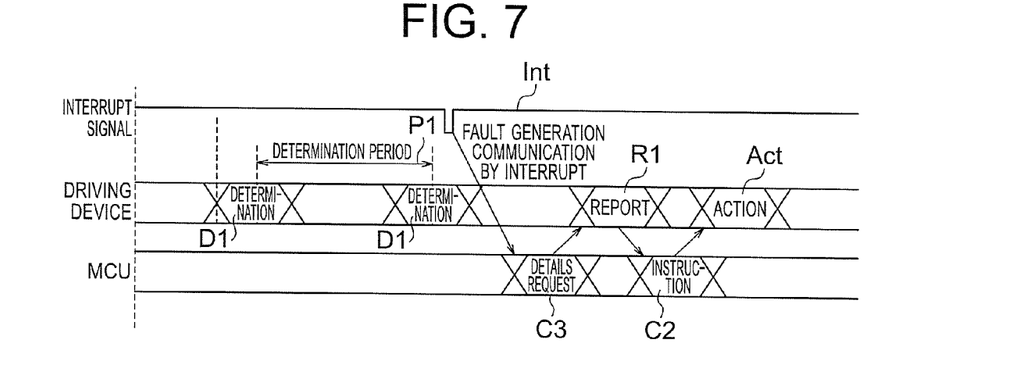
FIG. 7 is a time chart, upon fault occurrence, between an MCU and a driving device in Operation example 2 of the driving device according to Embodiment 1 of the present invention.

FIG. 7 illustrates a time chart in a case where a fault occurs in at least one of the actuators 6. In FIG. 7, the reference symbol Int is an interrupt signal that is transmitted from the interrupt generator 15. In the example of FIG. 7, the interrupt signal Int is at a H level normally, and at a L level abnormally. However, the level of the interrupt signal Int is not limited thereto, and the interrupt signal Int may be set to be at a H level abnormally, and at a L level normally. In FIG. 7, the reference symbol C3 is a detailed information request that is transmitted from the MCU 2 to the driving device 5. The detailed information request is an instruction of requesting the driving device 5, upon occurrence of a fault, to transmit the fault report R1 including detailed information relating to that fault. The reference symbol Act is an action corresponding to the fault that has occurred.

As illustrated in FIG. 7, in the routine work by the driving device 5 illustrated in the flow of FIG. 6, in a case where in step S007 it is determined that a fault has occurred in one of the actuators 6, the interrupt generator 15 transmits the interrupt signal Int to the MCU 2, to thereby notify the MCU 2 of the occurrence of the fault. The MCU 2 outputs the detailed information request (instruction C3) to the driving device 5 in order to obtain detailed information for the fault. In response thereto, the driving device 5 transmits, to the MCU 2, the fault report R1 including the detailed information of the fault. On the basis of the content of the received fault report R1, the MCU 2 determines the content of the action that is to be instructed to the driving device 5. As a processing example, for instance, the MCU 2 instructs the driving device 5 to stop the periodic fault determination routine and stop immediately the actuator at which the fault has occurred. The determination method of the action content by the MCU 2 may be, for instance, a method wherein the MCU 2 has a look-up table in which there is established beforehand a correspondence between the content of the fault report R1 and the content of the action corresponding thereto, and the MCU 2 refers to the look-up table to determine the content of the action that is to be instructed to the driving device 5.

Figure 8:
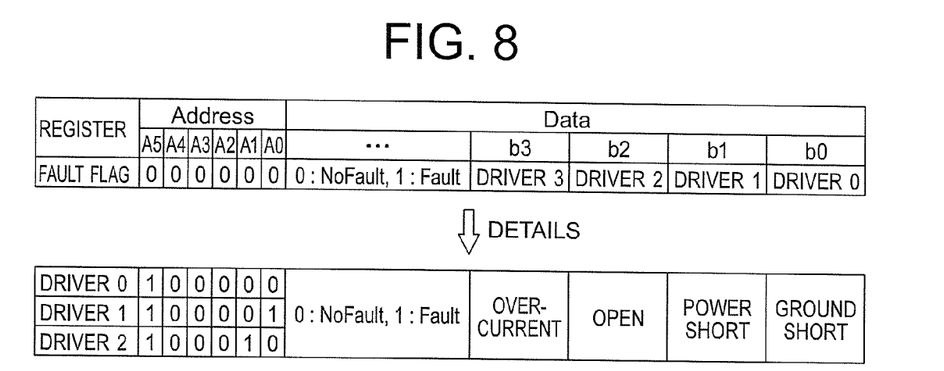
FIG. 8 is an explanatory diagram illustrating a memory map pertaining to fault determination in the driving device according to Embodiment 1 of the present invention.

FIG. 8 illustrates a memory map in the data unit 10b of the memory device 10. As the top diagram in FIG. 8 illustrates, occurrence or absence of a fault for each actuator 6 that is driven by the driving device 5 is allocated to each bit in a fault flag register at a specific address (herein, 6'b000000). The values of these bits are fault flags. A fault flag "0" represents normal and "1" represents abnormal. Information indicating in which actuator (driver 0, 1, 2 or 3) a fault has occurred, and fault type information indicating what type of fault has occurred (overcurrent, open, power short, ground short), is stored as fault detailed information, as the bottom diagram in FIG. 8 illustrates.

As described above, when a fault occurs in at least one actuator from among the actuators 6, a determination result by the fault detection device 11 is written, as fault flags, in the fault flag register of the data unit 10b of the memory device 10 according to the memory map illustrated in FIG. 8. The interrupt generator 15 checks the value of each fault flag in the fault flag register of the data unit 10b of the memory device 10, and if the value of a fault flag is "1", generates the interrupt signal Int that is to be transmitted to the MCU 2.

Upon reception of the interrupt signal Int, the MCU 2 transmits a fault details request (C3) to the driving device 5. Upon reception of the fault details request (C3), the driving device 5 firstly refers to the fault flags of the fault flag register (6'b000000) and obtains fault information indicating in which actuator 6 (driver 0, 1, 2 or 3) the fault has occurred. Further, the driving device 5 refers to the fault detailed information in the fault flag register (6'b000000) and obtains fault detailed information, for instance fault type information (overcurrent, open, power short, ground short) for the actuator 6 in which a fault has occurred. The driving device 5 generates a fault report R1 including the fault information and the fault detailed information, and transmits the fault report R1 to the MCU 2.

On the basis of the fault report R1, the MCU 2 can recognize, for instance, the actuator 6 (driver 0, 1, 2 or 3) in which a fault has occurred, and the specific type of the fault (overcurrent, open, power short, ground short). The MCU 2 analyzes the recognized fault content, and instructs an action Act based on the analyzed fault content, to the driving device 5. As the action Act, the MCU 2 issues, to the driving device 5 that is controlling the actuator 6 in which a fault has occurred, for instance an instruction for discontinuing the operation of that actuator 6.

In FIG. 7 an example is explained where the MCU 2 transmits the fault details request (C3) in a case where an interrupt signal is received, but Embodiment 1 is not limited to this scheme. For instance, the following scheme may be resorted to as well.

Firstly, the MCU 2 recognizes fault occurrence, through reception of the interrupt signal Int. The MCU 2 transmits first, to the driving device 5, the fault determination request (instruction C1) in order to obtain information relating to the fault. In response thereto, the driving device 5 refers to the fault flags of the fault flag register (6'b000000), and transmits, to the MCU 2, a fault report R1 including fault information. On the basis of the fault report R1, the MCU 2 can recognize in which actuator 6 (driver 0, 1, 2 or 3) a fault has occurred.

Next, the MCU 2 transmits a fault details request (C3) to the driving device 5, in order to obtain detailed fault type information (overcurrent, open, power short, ground short) for the actuator 6 in which a fault has occurred. In response thereto, the driving device 5 refers to the fault detailed information in the fault flag register (6'b000000), and transmits, to the MCU 2, the fault report R1 including the fault detailed information.

Also, fault information and fault detailed information may be obtained in two stages, i.e. transmission of the fault determination request (instruction C1) and reception of the fault report R1 in response thereto, and, thereafter, transmission of the fault details request (C3).

FIG. 6 serves also as a fault detection flowchart of Operation example 2. In Operation example 2 the process from step S001 to S006 is identical to that in Operation example 1. Accordingly, the explanation will omit step S001 to S006 and will apply to step S007 onwards. In Operation example 2, a fault occurs in an actuator 6; in step S007, accordingly, the process proceeds to step S012. In step S012, the driving device 5 sets an error flag in the data unit 10b of the memory device 10. Simultaneously therewith, the driving device 5 transmits the interrupt signal Int to the MCU 2 using the interrupt generator 15, and immediately notifies the MCU 2 of the fault occurrence. After the above notification, the driving device 5 terminates the program process.

In a case where a fault occurs in step S007 in the example of the flowchart of FIG. 6, the process proceeds to step S012 and exits the loop. However, the process may remain in the loop, and the fault determination result may be reported to the MCU 2 from the driving device 5 after the number of repeats has been reached, as in Operation example 1. Such modification and changeover of process contents can be controlled according to a program sequence that is loaded onto the code unit 10a of the memory device 10.

Operation Example 3

Figure 9:
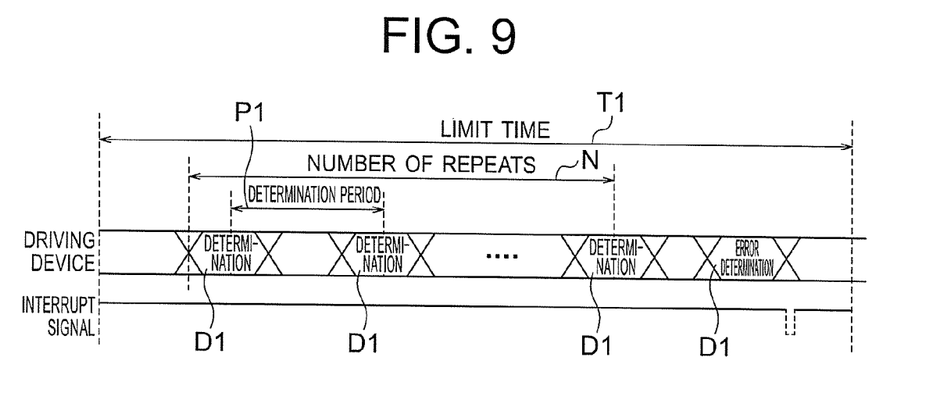
FIG. 9 is a time chart, upon fault occurrence, between an MCU and a driving device in Operation example 3 of the driving device according to Embodiment 1 of the present invention.

An example will be explained herein in which, unlike in the case of Operation example 2, even though a fault occurs, fault determination is carried out for the number of times set in the number of repeats N, as illustrated in FIG. 9, without transmission of the interrupt signal Int immediately following detection of a fault; thereafter, the interrupt signal Int is transmitted according to a comparison between the number of fault occurrences and a prescribed number of errors (threshold value) set beforehand. In Operation example 3, specifically, fault detection is repeatedly carried out for the number of repeats N, over the determination period P1 within the limit time T1, and the interrupt signal Int is transmitted to the MCU 2 in a case where, as a result, the number of fault occurrences is equal to or greater than a prescribed number of errors determined beforehand (threshold value).

Figure 10:
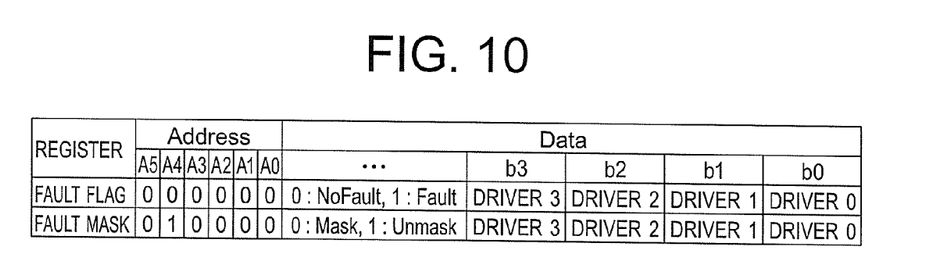
FIG. 10 is an explanatory diagram illustrating an additional memory map pertaining to fault determination in the driving device according to Embodiment 1 of the present invention.

In fault determination in Operation example 3, a fault is not determined immediately upon occurrence of an error once, unlike in the case of Operation example 1 and Operation example 2. In Operation example 3, for instance, the interrupt signal Int for the MCU 2 is generated through execution of fault determination on the basis of a fault determination result (number of error occurrences equal to or greater than a prescribed number of errors (threshold value)) after execution of fault determination for the number of repeats N, without causing the interrupt signal Int to be generated in the MCU 2 immediately unlike in the case of Operation example 2. To that end, a fault mask register such as the one FIG. 10 is provided for each actuator 6, similarly to the case of fault flags of FIG. 8. In the fault mask register, a fault mask of an actuator 6 for which an interrupt to the MCU 2 is generated immediately upon occurrence of a fault is set to "1", and the fault mask of an actuator 6 for which no interrupt to the MCU 2 is generated immediately, even if a fault occurs, is set to "0". The memory device 10 has thus a fault mask register for designating, for each actuator 6, an alternative between permitting and prohibiting transmission of the interrupt signal Int by the interrupt generator 15. As a result, the interrupt generator 15 does not transmit the interrupt signal Int to the MCU 2 for the actuators 6 the fault mask whereof has been set to "0", even if the fault flag is "1". In a case where, by contrast, the fault flag is "1", the interrupt generator 15 immediately transmits the interrupt signal Int to the MCU 2, for the actuators 6 the fault mask whereof has been set to "1". For the actuators 6 the fault mask whereof has been set to "0", thus, software processing is performed wherein the interrupt is masked, and upon fault determination after execution of fault determination for the number of repeats N, the mask is cleared, to reflect thereby the fault determination result on an error flag.

Figure 11:
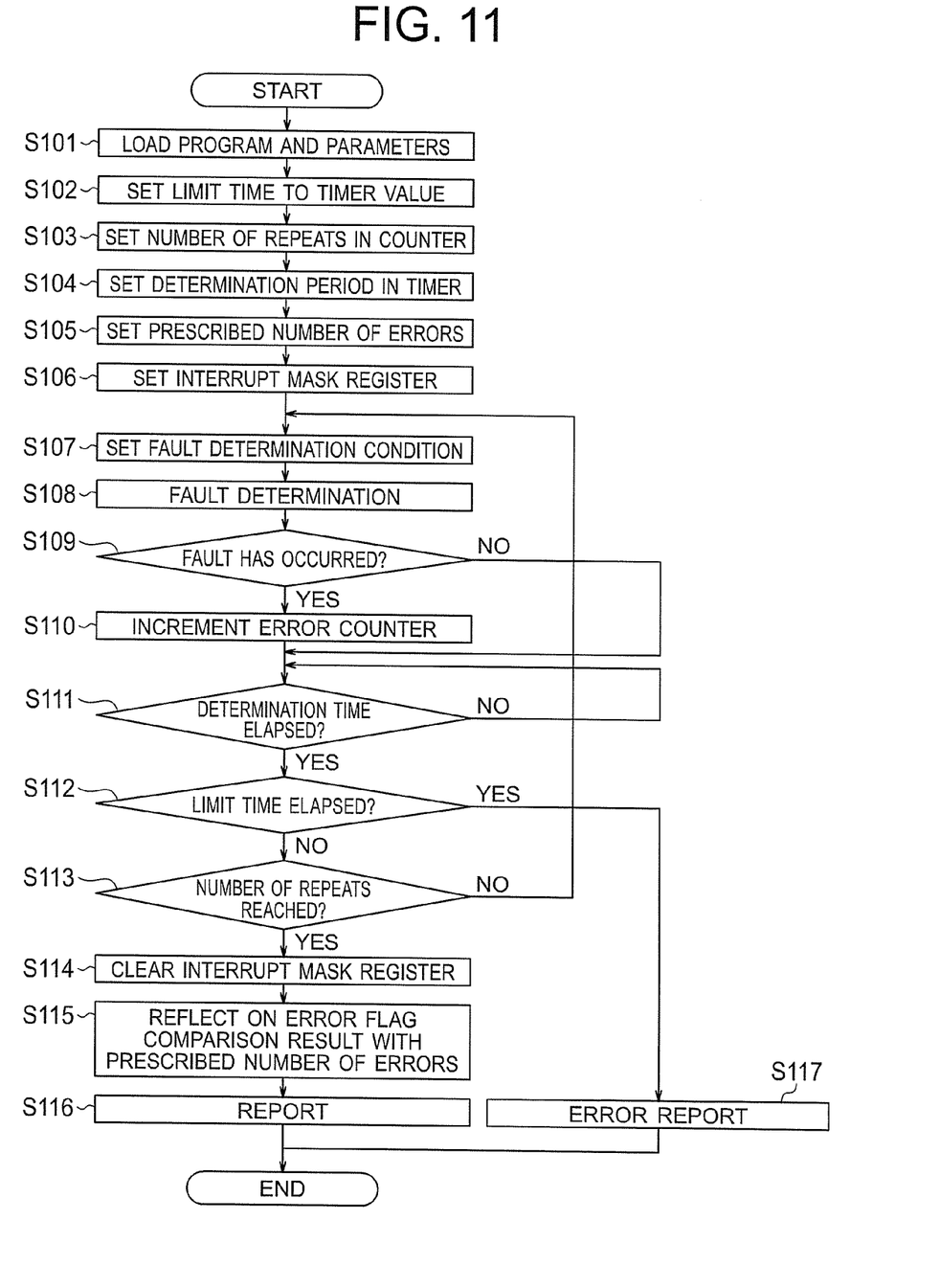
FIG. 11 is a flowchart illustrating a process flow in Operation example 3 of the driving device according to Embodiment 1 of the present invention.

FIG. 11 illustrates a fault diagnosis flowchart of the driving device 5 according to Operation example 1 of Embodiment 3. The process in steps S101 to S104, S107 to S108, S111 to S113 and S116 of FIG. 11 correspond basically to steps S001 to S006 and S008 to S011 in FIG. 6. Accordingly, these processes will be explained next in a simplified manner.

As illustrated in FIG. 11, the driving device 5 firstly imports programs and parameters from the MCU 2 into the memory device 10 in the logical unit 8, via the serial interface 7, in step S101.

Next, if there is a parameter for setting the limit time T1 in the imported program, in step S102 the driving device 5 sets the limit time T1 in the timer device 16 on the basis of the above parameter.

Next, if there is a parameter for setting the number of repeats N in the imported program, in step S103 the driving device 5 sets the number of repeats N in the counter device 17. The counter device 17 decrements the counter value each time that one fault determination is complete.

Next, if there is a parameter for setting the determination period P1 in the imported program, in step S104 the driving device 5 sets the determination period P1 in the timer device 16, on the basis of the above parameter.

Next, in step S105, the prescribed number of errors (threshold value) is imported into the memory device 10, and the counter value of the number of fault occurrences of the counter device 17 is reset.

Next, in step S106, interrupt mask information is allocated to the data unit 10*b* of the memory device 10 according to the memory map in FIG. 10, in response to an instruction from the MCU 2 or from outside. For the sake of a simpler explanation, the fault mask is set herein to "0" for all the actuators 6.

Next, in step S107, a fault determination condition (voltage, temperature, operation mode and the like) is set, if there is any.

Next, in step S108, fault determination is performed in the fault detection device 11. The fault detection device 11 determines the occurrence or absence of a fault (power short, ground short, open, overcurrent) in each actuator 6, and stores a normal/abnormal status, in the form of a fault flag "0"/"1", in the fault flag register of the data unit 10*b* of the memory device 10. Upon fault detection, the fault detection device 11 detects as well the type of the fault (power short, ground short, open, overcurrent), and the type of the fault is stored in a detailed information register of the data unit 10*b* of the memory device 10.

Next, in step S109, the driving device 5 checks the value of the fault flags in the fault flag register in the data unit 10*b* of the memory device 10 having the fault determination result stored therein, using the interrupt generator 15. If a fault has occurred, the process proceeds to step S110; otherwise, the process skips S110.

In step S110 the counter value of the number of fault occurrences of the counter device 17 is incremented. In this case, "0" is set as the fault mask in the fault mask register, and, accordingly, no interrupt signal to the MCU 2 is generated by the interrupt generator 15.

In step S111 the process waits out until the determination period P1 elapses.

Next, in step S112, it is checked where the limit time T1 has been exceeded or not. If the limit time T1 has been exceeded, this is reported to the MCU 2, and the present process is terminated. If the limit time T1 has not been exceeded, the process proceeds to step S113.

In step S113 there is checked the counter value of the number of repeats N of the counter device 17; if the number of repeats N has not been reached, the process from step S107 to S112 is repeated. If the fault determination condition needs to be modified, the latter is modified in step S107. If on the other hand the number of repeats N has been reached, the process proceeds to step S114.

In step S114 the value of the fault mask in the fault mask register is set to "1".

In step S115, the prescribed number of errors (threshold value) and the counter value of the number of fault occurrences of the counter device 17 are compared; if the counter value of the number of fault occurrences exceeds the prescribed number of errors (threshold value), the driving device 5 raises an error flag. In that case, the fault mask register is cleared to "1", and an interrupt signal Int to the MCU 2 is generated by the interrupt generator 15.

In step S116, the driving device 5 transmits the fault determination result to the MCU 2, via the serial interface 7. After the above transmission, the driving device 5 terminates the program process.

Pseudo-errors can be reduced thus in Operation example 3 since the driving device 5 has a function of masking interrupts.

Operation Example 4

Operation examples 1, 2 and 3 above have been described for the hardware structure illustrated in FIG. 4. In these operation examples, the program in the code unit 10*a* of the memory device 10 is read and sequentially processed by the CPU 9. In a case where processing at a higher speed is required, such processing needs to be implemented in the form of hardware. In Operation example 4 an example will be illustrated in which the same functions as in Operation examples 1, 2 and 3 are realized on the basis of a different hardware structure. In Operation example 4 there will be explained an operation example for the hardware structure illustrated in FIG. 12.

Figure 13:
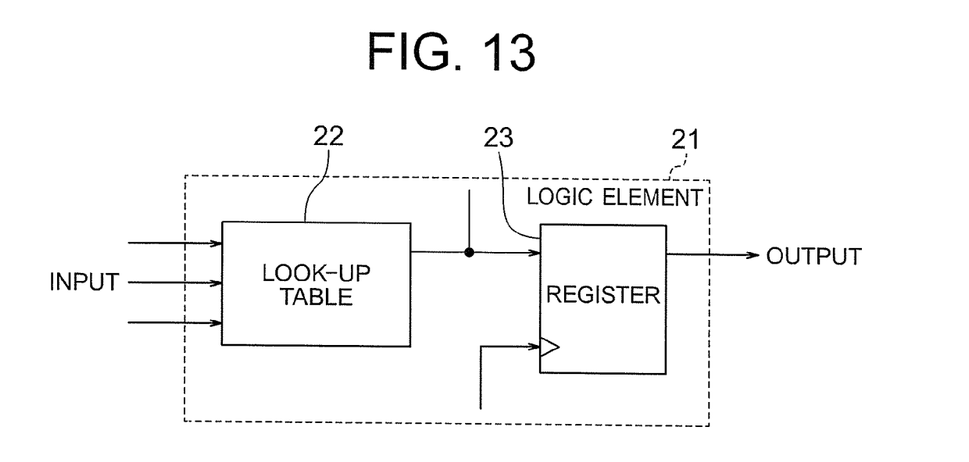
FIG. 13 is a block diagram illustrating an example of a logic element that makes up a program logic array in a variation of the driving device according to Embodiment 1 of the present invention.

In FIG. 12, a program logic array 18 substitutes for the CPU 9 having the computing device 12, the control device 13 and the register device 14, as well as for the timer device 16 and the counter device 17, of FIG. 4. The program logic array is for instance a circuit configured from a logic element (group) 21 each made up of a look-up table 22 having three inputs and one output, and a register 23 as illustrated in FIG. 13, such that an arbitrary logic can be constructed through re-configuration of the wiring of the logic elements 21 that are laid out according to the below-described configuration.

The program sequence described in FIG. 6 or FIG. 11 is mapped in a format referred to as configuration information, using a logic synthesis tool. The configuration information is stored in the memory device 10, from outside or from the MCU 2, via the serial interface 7, to enable as a result hardware processing of the above functions.

The process flow and process content in Operation example 4 are basically identical to those of Operation examples 1 to 3, and an explanation thereof will be omitted herein. The particulars of the process flow and process content are to be referred thus to those of Operation examples 1 to 3. When referring to Operation examples 1 to 3, however, all the operations of the CPU 9 having the computing device 12, the control device 13 and the register device 14, and of the timer device 16 and the counter device 17 are to be re-read as the operation of the program logic array 18.

In Operation example 4, thus, the CPU 9, the timer device 16 and the counter device 17 in Operation examples 1 to 3 are configured in the form of the program logic array 18, and hence the same operations as in Operation examples 1 to 3 are enabled herein. In Operation example 4 as well, therefore, the fault determination requirement can be modified for each actuator 6, as is the case in Operation examples 1 to 3. The same effects as those of Operation examples 1 to 3 can be elicited as a result in Operation example 4.

As explained above, using Operation examples 1 to 4, Embodiment 1 of the present invention allows performing fault determination according to a desired fault determination requirement, simply through rewriting of the fault determination requirement in the memory device 10, since the driving device determines faults through software processing. As a result, fault determination requirements that are specific to each actuator 6 based on various fault determination requests and scenarios can be used for diverse specifications of fault determination, without modifying the driving device 5. This can be expected to translate into shorter product development lead times and lower costs, while allowing for an implementation in the form of an application specific standard product (ASSP) that includes the driving device 5.

The fault determination results for N times are set to be transmitted collectively, without transmission of a determination result each time that fault determination is performed. Accordingly, this contributes significantly to reducing data traffic volume between the MCU 2 and the driving device 5 and to uphold real-time processing. Moreover, a power consumption reduction effect and noise reduction effect can be expected to be achieved through a reduction in the volume of data traffic.

Further, there is provided a fault mask register for designating whether an interrupt is to be masked or not, and the interrupt signal Int is set to be transmitted only in a case where fault occurrence is detected for a predetermined or greater number of times, without transmission of an interrupt signal immediately after fault detection. Therefore, this allows eliminating pseudo-fault determination from the driving device 5 to the MCU 2, while reducing processing in the MCU 2.

As illustrated in FIG. 12, there may be used a configuration-based program logic array 18, in which case processing performance can be made faster while maintaining the above effects.

What is claimed is:

1. A driving device that is connected between a control unit and an actuator and that drives the actuator through control by the controller, the driving device comprising:
   a fault detection device that performs one or more fault determinations to determine whether or not a fault occurs in the actuator;
   a serial interface that communicates with the controller;
   a memory device that stores a result of the fault determinations and a program executed by a processor via the serial interface;
   the processor that, according to a fault determination request from the controller, executes the program, and causes the fault detection device to execute the fault determinations;
   a timer that measures a time limit time for the fault determinations and a determination period for each of the fault determinations; and
   a counter that counts, during the time limit, a number of times that the fault determinations are executed by the fault detection device, and a number of fault occurrences in the actuator that are detected by the fault detection device,
   wherein, in response to receiving the fault determination request from the controller, the processor executes the program to cause the fault detection device to execute the fault determinations for the number of times within the time limit and to execute each of the fault determination during the determination period, and after the time limit elapses, transmits the result of the fault determinations to the controller.

2. The driving device according to claim 1,
   wherein the memory device stores a fault determination requirement of the fault determinations for each fault detection device corresponding to the actuator.

3. The driving device according to claim 2,
   wherein the memory device stores the time limit, the determination period, the number of times that the fault determinations are executed and the fault determination requirement, for each fault detection device corresponding to the actuator.

4. The driving device according to claim 3, further comprising an interrupt generator that detects the fault occurrences in the actuator based on the result of the fault determinations stored in the memory device, and in a case where a fault has occurred in the actuator, transmits an interrupt signal to the controller to notify the controller of the fault of the actuator.

5. The driving device according to claim 4,
   wherein the memory device has a fault mask register for designating, for each actuator, an alternative between permitting and prohibiting transmission of the interrupt signal by the interrupt generator.

6. The driving device according to claim 2, further comprising an interrupt generator that detects the fault occurrences in the actuator based on the result of the fault determinations stored in the memory device, and in a case where a fault has occurred in the actuator, transmits an interrupt signal to the controller to notify the controller of the fault of the actuator.

7. The driving device according to claim 6,
   wherein the memory device has a fault mask register for designating, for each actuator, an alternative between permitting and prohibiting transmission of the interrupt signal by the interrupt generator.

8. The driving device according to claim 1,
   wherein the processor, the timer and the counter are configured in a program logic array.

9. The driving device according to claim 8, further comprising an interrupt generator that detects the fault occurrences in the actuator based on the result of the fault determinations stored in the memory device, and in a case where a fault has occurred in the actuator, transmits an interrupt signal to the controller to notify the controller of the fault of the actuator.

10. The driving device according to claim 9,
    wherein the memory device has a fault mask register for designating, for each actuator, an alternative between permitting and prohibiting transmission of the interrupt signal by the interrupt generator.

11. The driving device according to claim 1, further comprising an interrupt generator that detects the fault occurrence in the actuator based on the result of the fault determinations stored in the memory device, and in a case where a fault has occurred in the actuator, transmits an interrupt signal to the controller to notify the controller of the fault of the actuator.

12. The driving device according to claim 11,
    wherein the memory device has a fault mask register for designating, for each actuator, an alternative between permitting and prohibiting transmission of the interrupt signal by the interrupt generator.

* * * * *